United States Patent
Huh et al.

(10) Patent No.: US 10,779,610 B2
(45) Date of Patent: Sep. 22, 2020

(54) PROCESS FOR MANUFACTURING AND BONDING A SHOE RUBBER OUTSOLE

(71) Applicant: HENKEL AG & CO. KGAA, Duesseldorf (DE)

(72) Inventors: Sung-Hwan Huh, Tangerang (ID); Myongchul Ryu, Busan (KR)

(73) Assignee: HENKEL AG & CO. KGAA, Duesseldorf (DE)

( * ) Notice: Subject to any disclaimer, the term of this patent is extended or adjusted under 35 U.S.C. 154(b) by 180 days.

(21) Appl. No.: 16/009,475

(22) Filed: Jun. 15, 2018

(65) Prior Publication Data

US 2018/0289104 A1 Oct. 11, 2018

Related U.S. Application Data

(63) Continuation of application No. PCT/EP2016/081374, filed on Dec. 16, 2016.

(30) Foreign Application Priority Data

Dec. 18, 2015 (EP) .................................... 15201236

(51) Int. Cl.
| | | |
|---|---|---|
| *A43B 13/04* | (2006.01) | |
| *A43B 13/32* | (2006.01) | |
| *C09J 175/06* | (2006.01) | |
| *C08G 18/10* | (2006.01) | |
| *C08G 18/42* | (2006.01) | |
| *C08G 18/73* | (2006.01) | |
| *C08G 18/75* | (2006.01) | |
| *C09J 175/04* | (2006.01) | |

(52) U.S. Cl.
CPC .............. *A43B 13/04* (2013.01); *A43B 13/32* (2013.01); *C08G 18/10* (2013.01); *C08G 18/4238* (2013.01); *C08G 18/73* (2013.01); *C08G 18/755* (2013.01); *C09J 175/04* (2013.01); *C09J 175/06* (2013.01); *C08G 2170/80* (2013.01); *C08G 2170/90* (2013.01); *C08G 2410/00* (2013.01)

(58) Field of Classification Search
CPC ............ C08G 2410/00; C08G 2170/90; C08G 2170/80; C08G 18/755; C08G 18/4238; C08G 18/10; C08G 18/73; C09J 175/04; C09J 175/06; A43B 13/32; A43B 13/04
USPC .......................................................... 156/242
See application file for complete search history.

(56) References Cited

U.S. PATENT DOCUMENTS

| | | |
|---|---|---|
| 4,910,822 A | 3/1990 | Paolucci |
| 9,028,645 B2 | 5/2015 | Huh |
| 2002/0038925 A1 | 4/2002 | Reimer |
| 2012/0144603 A1* | 6/2012 | Huh ..................... C09J 109/00 12/142 RS |

FOREIGN PATENT DOCUMENTS

| | | |
|---|---|---|
| CN | 1468927 A | 1/2004 |
| CN | 101121869 A | 2/2008 |
| EP | 1234517 A1 | 8/2002 |
| KR | 10-0191275 B1 | 6/1999 |
| KR | 20000063527 A | 11/2000 |
| TW | 201002234 A1 | 1/2010 |
| WO | 2011020757 A2 | 2/2011 |
| WO | 2012069587 A1 | 5/2012 |
| WO | 2013100501 A1 | 7/2013 |

* cited by examiner

*Primary Examiner* — Philip C Tucker
*Assistant Examiner* — Vicki Wu
(74) *Attorney, Agent, or Firm* — Sun Hee Lehmann

(57) ABSTRACT

The present invention relates to a process for manufacturing a shoe rubber outsole using a special heat and pressure stable water-based polyurethane dispersion adhesive as well as a process for manufacturing a shoe using the outsole manufactured as described herein and an PUD-based adhesive composition for the described processes.

8 Claims, No Drawings

PROCESS FOR MANUFACTURING AND BONDING A SHOE RUBBER OUTSOLE

FIELD OF THE INVENTION

The present invention relates to a process for manufacturing a shoe rubber outsole using a special heat and pressure stable water-based polyurethane dispersion adhesive as well as a process for manufacturing a shoe using the outsole manufactured as described herein and an PUD-based adhesive composition for the described processes.

BACKGROUND OF THE INVENTION

Generally, a rubber outsole is prepared by vulcanizing unvulcanized rubber which is cut into a planar or structured shape. Examples of conventional technologies related to this rubber outsole preparation method are disclosed in Korean Patent Registration No. 10-0191275 and Korean Patent Application Publication No. 2000-0063527 as well as in international patent publication WO 2011/020757 A2.

Korean Patent Registration No. 10-0191275 discloses a method of integrally forming a rubber outsole of a shoe and a polyurethane midsole, including the steps of: forming a rubber outsole such that a band-shaped projecting part having a predetermined width is provided over the entire periphery thereof and reticularly-arranged protrusions are formed on the surface thereof; heat-treating the rubber outsole such that the surface temperature thereof is about 40 to 50° C.; and spraying an undiluted polyurethane solution onto the heat-treated rubber outsole to integrally form a midsole on the rubber outsole.

Korean Patent Application Publication No. 2000-0063527 discloses a shoe outsole and a method of manufacturing the same in which the outsole and midsole are simultaneously formed and attached through a single process.

International patent publication WO 2011/020757 A2 discloses methods of manufacturing shoes by using a multifunctional primer. In the described processes, the unvulcanized rubber outsole is coated with a multifunctional primer comprising a polyurethane dispersion (PUD), a butadiene rubber solution and a natural rubber solution before vulcanization. The outsole is then thermally activated, coated with an adhesive and attached to the other shoe parts. While said method is already advantageous over the conventional processes in that it provides for a process that avoids laborious additional washing steps, there is still need in the art for simplification of a rubber outsole and/or shoe manufacturing process.

BRIEF SUMMARY OF THE INVENTION

Accordingly, an object of the present invention is to provide a further simplified method of manufacturing a shoe.

In order to accomplish the above object, a first aspect of the present invention provides a process for manufacturing a shoe rubber outsole, comprising the steps of:
(1) treating an uncured rubber material by UV irradiation or plasma;
(2) applying an adhesive composition to the treated rubber material of the step (1) and drying the rubber material, wherein said adhesive composition comprises a heat and pressure stable water-based polyurethane dispersion; and
(3) curing the rubber material obtained in the step (2).

In another aspect, the invention is directed to a process for manufacturing a shoe, comprising
(1) thermally activating the shoe rubber outsole obtained according to the process for manufacture of a shoe rubber outsole as described herein; and
(2) attaching the activated shoe rubber outsole to one or more other shoe parts, preferably a shoe midsole.

In still another aspect, the present invention is also directed to an adhesive composition for an uncured rubber material, comprising relative to the total weight of the composition:
a) 90 to 99.9 wt. % of a water-based polyurethane dispersion, preferably a polyester polyol based polyurethane;
b) 0.1 to 1 wt. % of at least one cross-linker, preferably a polycarbodiimide;
c) 0 to 1 wt. % of at least one nonionic surfactant;
d) 0 to 5 wt. % of at least one filler, preferably fumed silica;
e) 0 to 0.1 wt. % of at least one antifoaming agent;
f) 0 to 1 wt. % of at least one HEUR thickener.

The use of said adhesive composition for treatment of an uncured rubber material, preferably a shoe rubber outsole, is also encompassed by the present invention.

DETAILED DESCRIPTION OF THE INVENTION

It has surprisingly been found that by using such a process as described herein several washing steps necessary in the conventional processes known, for example, from KR 10-0191275 and KR 2000-0063527, as well as separate priming and cementing steps can be omitted, as the special treatment by UV irradiation or plasma and the following application of the special heat and pressure-stable PUD obviate the need for these additional steps and thus significantly simplifies and accelerates the manufacturing process. More specifically, existing processes include a first step of heat-pressing the uncured rubber outsole to cure the rubber material, followed by a step of degreasing the rubber outsole, drying, priming, another drying step, thermally activating the rubber outsole material, application of the adhesive, drying and attaching the other shoe parts. The improved process described in WO 2011/020757 A2 still requires the use of a multifunctional primer composition that is coated onto the uncured rubber material of the outsole without a prior degreasing step prior to curing. After curing, the material is thermally activated and then the adhesive is applied to facilitate attachment of the other shoe parts. In contrast to these methods, the present process includes the step of treating the uncured material by UV irradiation or plasma, replacing the priming step, then directly applying the adhesive composition prior to the curing step. After curing, the rubber outsole material is thermally activated at a temperature of at least 55° C. and then the other shoe parts are attached.

"Heat and pressure stable", as used herein in relation to the PUD adhesive, refers to a PUD that can withstand the heat and pressure typically applied for rubber cure, i.e. vulcanization. This usually means a temperature of about 150 to 200° C., typically about 160° C., and a pressure of 50 to 200 bar (kgf/cm$^2$), typically about 150 bar, for about 5 to 10 minutes. This means that said PUD does not suffer from substantial polymer degradation under said conditions.

It has been found that the treatment of the uncured rubber material by UV irradiation or plasma changes the material properties of the rubber material such that the typically non-polar material becomes more polar, which in turn increases compatibility with the PUD adhesive. This has the advantage that no additional primer that is used to ensure compatibility and adhesion between the rubber material and the adhesive is needed.

The rubber material may be any rubber material known and used for shoe production. Accordingly, included are natural as well as synthetic rubber materials, such as butadiene-based rubbers, including, inter alia, butadiene rubber, acrylonitrile-butadiene rubber, styrene-butadiene-styrene rubber and the like. The rubber material that is treated in step (1) of the process described herein may already be pre-formed, for example by cutting or any other forming technology, to the planar or structured shape of a shoe outsole. The final form of the outsole is typically obtained during the curing, which is commonly done by heat-pressing.

The UV irradiation can be done by any suitable type of UV, i.e. generally light of a wavelength below 380 nm, typically between 100 and 380 nm (according to DIN 5031 part 7, January 1984). For the UV irradiation numerous suitable irradiation source are known and readily commercially available. Energy input is preferably 1.7 to 3.5 J/cm$^2$, more preferably 2.0 to 2.5 J/cm$^2$, over a time period of 1 to 30 seconds, typically 10-20 seconds.

Plasma treatment can occur over longer periods of time, typically 10 to 60 minutes, preferably 20 to 30 minutes with a generator that has an output of 40 kHz/200 W.

In the next step the treated rubber material is contacted with the adhesive composition comprising a PUD, typically by spraying/brushing/painting the composition onto the rubber material surface. Alternatively, other well-known coating and application techniques can be used. The PUD is a water-based polyurethane polymer dispersion, preferably comprising 30 or more, typically 40 to 60% by weight solids (as, for example, determined by drying loss measurements at 150° C. for 30 minutes to evaporate the water/solvents), with the solids being mainly composed of the polyurethane polymer particles of a diameter between 30 and 1000 nm, preferably between 100 and 500 nm, more preferably between 150 and 300 nm (as determined by dynamic light scattering (DLS) according to ISO 22412).

The liquid phase of the dispersion comprises or consists of water, and may, in certain embodiments, also include minor amounts of organic solvents or other liquid components, although it is preferred that it consists essentially of water, i.e. to about 95 vol. %. In the PUD, the liquid phase makes up 40 to 70% by weight, typically 40 to 60% by weight.

The polyurethane polymer particles can be made of any suitable polyurethane, typically thermoplastic polyurethanes, preferably made of polyester or polyester polyols and a molar excess, relative to the molar ratio of isocyanate and hydroxyl groups, of polyisocyanates. The polyols are preferably linear polyols. In various embodiments, the polyurethane is thus an NCO-terminated polyurethane, preferably obtained from a reaction mixture comprising a polyester polyol, preferably obtained from a reaction mixture comprising adipic acid and 1,4-butanediol, and a molar excess relative to the molar ratio of isocyanate and hydroxyl groups of a polyisocyanate, preferably an aliphatic diisocyanate, more preferably hexamethylenediisocyanate (HDI) or isophoronediisocyanate (IPDI).

In various embodiments, the adhesive composition comprises, in addition to the PUD, which comprises polyurethane polymer particles and water, one or more additional components, such as, for example, known auxiliaries, including fillers, stabilizers, conservatives, antifoaming agents, emulsifiers, rheology modifying agents, colorants, and the like.

The adhesive compositions of the present invention preferably contain at least one cross-linker, with the cross-linker preferably being selected from polycarbodiimides and polyaziridines, more preferably polycarbodiimides. Exemplary cross-linkers that can be used according to the invention include, without limitation, N,N'-dicyclohexylcarbodiimide (DCC) and N,N'-diisopropylcarbodiimide (DIC). The cross-linker is advantageous, as it renders the polyurethane heat and pressure stable and less prone to degradation, as discussed above. Commercially available PUD-based adhesives without such a cross-linker often lack the required heat and pressure stability necessary to withstand the rubber vulcanization conditions.

In various embodiments, the adhesive composition comprises relative to the total weight of the composition:
a) 90 to 99.9 wt. %, preferably 95 to 99 wt. % of a water-based polyurethane dispersion;
b) 0.1 to 1 wt. %, preferably 0.1 to 0.5 wt. % of at least one cross-linker;
c) 0 to 1 wt. %, preferably 0.05 to 0.2 wt.-% of at least one nonionic surfactant;
d) 0 to 5 wt. %, preferably 0.2 to 0.4 wt. % of at least one filler;
e) 0 to 0.1 wt. %, preferably 0.01 to 0.05 wt. % of at least one antifoaming agent; and
f) 0 to 1 wt. %, preferably 0.3 to 0.8 wt. % of at least one HEUR thickener.

The nonionic surfactant may serve as an emulsifier and may be selected from the group consisting of alcohol ethoxylates (alkyl ethoxylates), alkylphenol ethoxylates, phenol ethoxylates, amide ethoxylates, glyceride ethoxylates, fatty acid ethoxylates, fatty amine ethoxylates, and mixtures thereof, preferably alkyl ethoxylates, such as polyethylene glycol $C_{8-20}$ alkyl ether, more preferably PEG 2-10 lauryl ether.

The filler may be selected from all known fillers suitable for PUD-based adhesives and the disclosed rubber applications. Preferred fillers are fumed silicas.

Known anti-foaming agents that may be used in accordance with the invention included organo-modified polysiloxanes.

HEUR type thickeners (hydrophobically modified ethylene oxide-urethane block copolymers) are also known in the art and all thickeners of these type suitable for the disclosed applications can be used.

The adhesive composition is preferably liquid and has a viscosity in the range of 6,000 to 20,000 mPa·s, preferably 8,000 to 15,000 mPa·s, more preferably 8,000 to 12,000 mPa·s at 25° C. as determined by a Brookfield viscometer (Spindle No. 63, 12 rpm). This allows simple application of the composition onto the uncured rubber material by existing instrumentation without unnecessary dripping, etc.

The step of curing the rubber material treated with the adhesive composition is preferably carried out by heat-pressing. This heat-pressing leads to vulcanization of the rubber and is typically carried out at temperatures above 120° C., such as 150 to 200° C., preferably about 160° C., and under increased pressure, such as 50 bar or more, typically 50 to 200 bar, preferably about 150 bar. The heat-pressing is carried out for a time sufficient to allow full curing of the rubber material, typically 2 minutes or more, such as 3 to 30 minutes, commonly 5 to 10 minutes. For the heat-pressing known and existing instrumentation may be used. In fact, the step of heat-pressing is carried out under the same conditions and using the same instrumentation as currently known in the art. As also mentioned above, the curing step may also include the feature of giving the rubber material the final form of the outsole. Typically, the rubber material is provided in form of a preform, which may, for example, be roughly cut to the form of the outsole. In these embodiments, the curing process, in particular by heat-pressing, imparts the final form to the outsole. The heat-pressing (vulcanization) may thus be carried out in a mold.

The manufacture of the shoe rubber outsole preferably comprises no additional washing steps or steps of applying a primer or an adhesive other than that described above. However, after application of the adhesive, a drying step can be carried out.

Once the shoe outsole has been manufactured, said rubber outsole may be used for the manufacture of the complete shoe. In such a process, the outsole is typically attached to other shoe parts, in particular the midsole. This process is generally carried out by thermally activating the shoe rubber outsole and then attaching the other shoe parts, in particular the shoe midsole, to the outsole. Other shoe parts that may be attached to the outsole or the midsole in this process include, without limitation, an insole, an upper and the like.

The step of thermally activating the rubber outsole material is generally known in the art and preferably includes heating the material to a temperature of more than 50 or 55° C. or higher. Preferred are temperatures in the range of 55 to 65° C. The step preferably takes 30 to 200 seconds, more preferably about 100 seconds. Thereafter, the activated rubber outsole is attached to another shoe part, preferably the midsole, and optionally the upper part of the shoe, typically by using a hydraulic (walled) sole attaching machine.

As already described in connection with the process of manufacturing the shoe outsole, the process of manufacturing the shoe does preferably neither includes any additional steps of degreasing or cleaning the outsole prior to the thermal activation and attachment nor steps of priming or applying another adhesive to the shoe rubber outsole prior to the activation and attachment step. However, it is possible to subject the other shoe parts, in particular the midsole, to conventional treatments before attachment to the outsole.

As described above, the method of manufacturing a shoe according to the present invention, compared to conventional shoe manufacturing methods, is advantageous in that processes of washing and priming a rubber outsole need not be conducted, thus improving productivity. Further, the method of manufacturing a shoe according to the present invention is advantageous in that production costs can be reduced by decreasing the number of workers and facilities due to the omission of the washing and priming processes and in that a shoe can be manufactured in an manner friendly to the environment due to the omission of the washing process.

The present invention also covers the special adhesive composition used in the processes of the invention and the use thereof for treatment of an uncured rubber material, preferably a shoe rubber outsole. It is understood that all the embodiments disclosed above in connection with the inventive processes, in particular those relating to the composition of the adhesive, are similarly applicable to the adhesive composition as such and its use.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The following examples further serve to illustrate the invention without, however, limiting it thereto.

EXAMPLES

Example 1

Adhesive Composition

| | Component | wt. % |
|---|---|---|
| 1 | Polyester PUD (based on NCO-terminated polyurethane prepolymer prepared from adipic acid/1,4-butanediol and HDI(base)/IPDI) solid content: 48-50% particle size: 200-240 nm (determined by DLS) | 96.4 |
| 2 | PEG lauryl ether ($M_w$ 2397 g/mol; 20% solution in water) | 0.5 |
| 3 | N,N'-dicyclohexylcarbodiimide or N,N'-diisopropylcarbodiimide (in 2-methoxy-1-methylethyl acetate) | 0.2 |
| 4 | Fumed silica (15% solution in water) | 2.21 |
| 5 | Emulsion of organo-modified polysiloxanes | 0.02 |
| 6 | HEUR type thickener | 0.67 |

Manufacture:
1. Input material no. 1 into tank and start mixing for 30 minutes.
2. Mix material no. 2 and no.3 for 10 minutes by mechanical stirrer and store for 30 minutes at RT.
3. Input mixture of no. 2 and no.3 by dropping and mixing for 1 hour.
4. Input no. 4 slowly and mixing for 1 hour.
5. Input Solution no.5 slowly and mixing for 30 minutes.
6. Input material no. 6 by dropping around for 1 hour and mixing for 3 hours.

Example 2

Shoe Manufacture

The adhesive composition according to example 1 was uniformly applied to an unvulcanized rubber outsole having been treated with UV irradiation for 15 s at 2 J/cm$^2$ using a brush and then a rubber vulcanization process was performed at 160° C. and 150 bar for 420 seconds. The vulcanized rubber outsole was thermally activated in a heating chamber at 55° C. for about 100 seconds. Thereafter, the thermally activated rubber outsole was manually attached to a midsole and an upper and then further attached using a hydraulic walled sole attaching machine to manufacture a shoe.

After 24 hours, a test for measuring the bonding strength between the rubber outsole and the midsole was conducted by measuring peel strength using a peel tester (5580, Instron).

The bonding strength of a shoe manufactured according to the present invention was 8.0 kgf/cm$^2$ which was significantly higher than that observed for a shoe that had been manufactured using the same process but Dispercoll XP2612 or Dispercoll U 2793 XP (PUD-based adhesive, commercially available from Bayer MaterialScience), which showed only 3.0-4.7 kgf/cm$^2$.

For comparative purposes the bonding strength of a shoe manufactured according to a conventional manufacturing process as described in Example 1 of WO 2011/020757 A2 was also determined as 8.0 kgf/cm$^2$. Accordingly, it was found that the process of the present invention provides for a similar bonding strength but a significantly simplified manufacturing process.

The invention claimed is:

1. A process for manufacturing a shoe rubber outsole, comprising the steps of:
   (1) treating an uncured rubber material by UV irradiation or plasma;
   (2) applying an adhesive composition to the treated rubber material of the step (1) and drying the rubber material of the step (1), wherein said adhesive composition comprises a heat and pressure stable water-based polyurethane dispersion; and
   (3) curing the rubber material obtained in the step (2).

2. The process according to claim 1, wherein
   (i) the uncured rubber material in step (1) is a shoe rubber outsole preform; and/or
   (ii) the rubber material obtained in step (2) is cured and formed to a shoe rubber outsole in step (3); and/or
   (iii) the rubber material is cured in step (3) by heat-pressing.

3. The process according to claim 1, wherein the adhesive composition comprises relative to the total weight of the composition:
   a) 90 to 99.9 wt. % of a water-based polyurethane dispersion;
   b) 0.1 to 1 wt. % of at least one cross-linker;
   c) 0 to 1 wt. % of at least one nonionic surfactant;
   d) 0 to 5 wt. % of at least one filler;
   e) 0 to 0.1 wt. % of at least one antifoaming agent; and
   f) 0 to 1 wt. % of at least one HEUR (hydrophobically modified ethylene oxide -urethane block) thickener.

4. The process according to claim 3, wherein the polyurethane is an NCO-terminated polyurethane, obtained from a reaction mixture comprising adipic acid and 1,4-butanediol, and a molar excess relative to the molar ratio of isocyanate and hydroxyl groups of a polyisocyanate.

5. The process according to claim 3, wherein the cross-linker is selected from the group consisting of polycarbodiimides and polyaziridines.

6. The process according to claim 3, wherein the nonionic surfactant is selected from the group consisting of alcohol ethoxylate, alkylphenol ethoxylates, phenol ethoxylates, amide ethoxylates, glyceride ethoxylates, fatty acid ethoxylates, fatty amine ethoxylates, and mixtures thereof.

7. The process according to claim 3, wherein the filler is fumed silica.

8. The process according to claim 1, wherein the composition is liquid and has a viscosity in the range of 6,000 to 20,000 mPa·s, at 25° C. as determined by a Brookfield viscometer (Spindle No. 63, 12 rpm).

* * * * *